United States Patent Office 3,429,971
Patented Feb. 25, 1969

3,429,971
METHOD OF TREATING AVIAN LYMPHOMATOSIS INDUCED BY ES₄ STRAIN OF LYMPHOMATOSIS VIRUS
Pierre Baranger, 6 Rue de Seine, Paris, France
No Drawing. Filed Feb. 28, 1967, Ser. No. 619,145
Claims priority, application France, Mar. 10, 1966, 52,820
U.S. Cl. 424—343     3 Claims
Int. Cl. A61k 27/00

ABSTRACT OF THE DISCLOSURE

A pharmaceutical composition comprising cis-2,6-dimethyl-$\Delta$-$^{2,6}$-octadiene-8-ol as the active ingredient. This medicament is effective to treat avian lymphomatosis virus strain ES₄.

---

It is an object of the present invention to provide a method of treating avian leukemia or lymphomatosis virus strain ES₄ by the administering of a pharmaceutical composition having, as its active ingredient, cis-2,6-dimethyl-$\Delta$-$^{2,6}$-octadiene-8-ol.

Still further objects and advantages of the composition and method of the present invention will become more apparent from the following more detailed description of the present invention.

The active antineoplastic medicament of the present invention is cis-2,6-dimethyl-$\Delta$-$^{2,6}$-octadiene-8-ol, commonly known as geraniol. The properties of this material can be found in the Merck Index, 7th edition, 1960, at page 477. It can be prepared by any of the conventional methods known in the art.

The active antiavian lymphomatosis medicament is preferably employed for treatment of avian lymphomatosis virus strain ES₄ as the active ingredient in a pharmaceutical composition comprising said active ingredient and a pharmaceutically acceptable vehicle or carrier.

Such a vehicle can be a liquid such as for use as an internally injectable medicament or oral administration or as a topical application as a pomade or cream. Any conventional pharmaceutically acceptable vehicle such as water, saline, glycerol, carboxymethyl cellulose, oils such as peanut oil, sesame oil, olive oil, propylene glycol, polyalkyleneglycols, and various other water-like vehicles employed in the preparation of an internally injectable medicament or a topically applied emulsion or suspension as a cream or pomade.

Similarly, the pharmaceutically acceptable vehicle can be a solid vehicle or carrier conventionally employed in the production of medicinal capsules or cachets and tablets.

The tablets prepared in accordance with the present invention preferably contain about 0.2 gram of the active cis-2,6-dimethyl-$\Delta$-$^{2,6}$-octadiene-8-ol although greater or lesser amounts can be advantageously employed where desired for medicinal purposes. In general from about 1 to 3 dosages of such tablets is a sufficient daily dosage of the antimedicament lymphomatosis virus strain ES₄.

The tablets, in addition to the active antineoplastic medicament contain the conventional dilutants, binders, disintegrators, lubricants, coloring agents and/or flavoring agents found in pharmaceutically acceptable compressed tablets. Suitable materials are those found in Husa's Pharmaceutical Dispensing, by Martin, 5th edition, 1959, pp. 67–69.

The same dilutants etc. as employed in the preparation of tablets containing the active antiavian lymphomatosis medicament of the present invention can also be employed in hard or soft gelatin capsules or rice flour cachets. Again, such capsules or cachets preferably contain about 0.2 gram of active medicament, a daily dosage of from about 1 to 3 of such capsules or cachets being sufficient for the treatment of lymphomatosis virus strain ES₄. This same dosage is also suitably employed when a liquid carrier is utilized to prepare an internally injectable pharmaceutical composition or a topical application of the antineoplastic medicament.

The cis-2,6-dimethyl-$\Delta$-$^{2,6}$-octadiene-8-ol of the present invention is particularly applicable for the treatment of avian lymphomatosis virus strain ES₄. The applicability for such purposes is shown by the following specific examples. It is to be understood that such examples are for purposes of illustration only and the present invention is in no way to be deemed as limited thereto.

EXAMPLE 1

The therapeutic effect of the medicament was determined with reference to avian lymphomatosis and compared with that of a known antileukemia agent, namely 6-mercaptopurine. Experiments were conducted on chickens with strain ES₄ of the lymphomatosis virus.

The chickens were subjected to the experiment at the age of four days.

Black Leghorns crossed with Rhode Island Reds were used.

The primary infection was obtained from a lyophilized virus ES₄ preparation. The virus was diluted in a Lemco bouillon solution in a proportion of 1 to 10. 0.2 cc. of the floating liquid were injected into the thigh muscle. The virulence of the injected dose was such that the chicks died within a maximum period of two weeks.

For subsequent passages on healthly chicks, the work was done using tumors that developed at the site of infection of the infected chicks. After isolation of the surrounding muscle, 1 g. of the tumor was ground with 9 cc. distilled water.

The floating liquid was used for subsequent injections, 0.2 cc. per chick, in the thigh. Here again the injected dose was such that the controls died in a period of less than two weeks.

The first therapeutic dose was administered 48 hours before the injection and 5 doses were given at a rate of one dose per day.

The inhibiting effect and the therapeutic action of the novel medicament were measured by the $Mr/Mt$, ratio of average survival of the treated animals in comparison to the controls, or by the number of cures effected.

TABLE 1

| Therapeutic agents | Doses in mg. | No. chicks | Mr/Mt | No. Cures |
|---|---|---|---|---|
| Cis-2, 6-dimethyl-$\Delta$$^{2,6}$- octadiene-8-ol | 1 | 15 | ---------- | 8 |
| Mercaptopurine | 1 | 15 | 2.05 | 0 |

The preceding table clearly shows the unexpected effectiveness of the cis-2,6-dimethyl-$\Delta$-$^{2,6}$-octadiene-8-ol of the present invention when compared to a known antileukemia medicament.

To further show the unexpected nature of the antineoplastic medicament of the present invention, various related alcohols were tested under the same conditions. The results are presented in the table below.

TABLE 2

| Therapeutic agents | Doses in mg. | No. chicks | Mr/Mt | No. Cures |
|---|---|---|---|---|
| 2,6-dimethyl-Δ²-octene-8-ol | 1 | 6 | ---------- | 1 |
| Trans-2,6-dimethyl-Δ²,⁶-octadiene-8-ol | 1 | 6 | 1.31 | 0 |
| 3,7,11-trimethyl-Δ²,⁶,¹⁰-docecatriene-1-ol | 1 | 6 | 1.52 | 0 |
| 2,6-dimethyl-Δ²,⁷-octadiene-6-ol | 1 | 6 | 1.24 | 0 |
| 1-methyl-4-isopropyl-ΔI-cyclohexane-8-ol | 1 | 6 | 1.30 | 0 |
| Undecylenic alchohol | 1 | 6 | 1.72 | 0 |
| Undecyl alchohol | 1 | 6 | 1.67 | 0 |
| Iso-octyl alcohol | 1 | 6 | 1.4 | 0 |
| Dodecyl alcohol | 1 | 6 | 1.3 | 0 |
| Decyl alcohol | 1 | 6 | 1.4 | 0 |
| Oleic alcohol | 0 | 6 | 1.5 | 0 |

These results clearly show that while certain other alcohols had an effect on lymphomatosis, such effect was to a much lesser degree, indicating the unexpected effectiveness of cis-2,6-dimethyl-Δ-²,⁶-octadiene-8-ol.

I claim:

1. A method of treating avian lymphomatosis induced by the ES$_4$ strain of lymphomatosis virus which comprises administering to a bird an effective amount of cis-2,6-dimethyl-Δ-²,⁶-octadiene-8-ol.

2. The method of claim 1 wherein said cis-2,6-dimethyl-Δ-²,⁶-octadiene-8-ol is present as the active ingredient in a pharmaceutically active vehicle.

3. The method of claim 1 wherein the treatment of avian lymphomatosis is conducted on chickens.

References Cited

Baranger et al.: Abstract of Papers, Ninth International Cancer Congress, Tokyo, Oct. 23–29, 1966, section 1–13f, Abstract No. 50643.

Chemical Abstract, 58: 8336g to 83376 (1963).

Dyer: An Index of Tumor Chemotherapy, National Cancer Institute, March 1949, pp. 10–12 and 69.

Field et al.: Cancer Research, vol. 18, No. 8, Part 2, September 1958, pp. 467–471 and 478.

ALBERT T. MEYERS, *Primary Examiner.*

J. GOLDBERG, *Assistant Examiner.*